(12) United States Patent
Wei et al.

(10) Patent No.: US 11,853,802 B1
(45) Date of Patent: Dec. 26, 2023

(54) CENTRALIZED AND DYNAMICALLY GENERATED SERVICE CONFIGURATIONS FOR DATA CENTER AND REGION BUILDS

(71) Applicant: Amazon Technologies, Inc., Seattle, WA (US)

(72) Inventors: Eric Wei, Seattle, WA (US); Andrew J. Lusk, Seattle, WA (US); Juan-Pierre Longmore, Seattle, WA (US); Anuj Prateek, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

(21) Appl. No.: 16/798,871

(22) Filed: Feb. 24, 2020

(51) Int. Cl.
*G06F 9/50* (2006.01)
*G06F 9/455* (2018.01)
*H04L 41/08* (2022.01)
*G06F 8/60* (2018.01)

(52) U.S. Cl.
CPC ........ *G06F 9/5038* (2013.01); *G06F 9/45558* (2013.01); *H04L 41/0876* (2013.01); *G06F 8/60* (2013.01); *G06F 2009/45562* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 2011/0041066 A1* | 2/2011 | Kimmet | H04L 41/22 715/736 |
| 2015/0215166 A1* | 7/2015 | Sharan | H04L 41/5058 709/221 |
| 2021/0208934 A1* | 7/2021 | Jadhav | G06F 9/5077 |

* cited by examiner

*Primary Examiner* — Lewis A Bullock, Jr.
*Assistant Examiner* — Melissa A Headly
(74) *Attorney, Agent, or Firm* — Thomas | Horstemeyer, LLP.

(57) ABSTRACT

Disclosed are various embodiments for centralized and dynamically generated service configurations for data center and other region builds. A computing environment may be configured to receive requests to deploy a new computing stack or service from different geographical regions at a central service. For the individual ones of the requests, the computing environment may identify computing resources of the computing environment required to deploy the new computing stack or service, determine an order of creation of the computing resources, and create at least one virtual process that automatically allocates the computing resources for the new computing stack based on a predetermined order of creation.

19 Claims, 6 Drawing Sheets

CENTRALIZED AND DYNAMICALLY GENERATED SERVICE CONFIGURATIONS FOR DATA CENTER AND REGION BUILDS

BACKGROUND

Various organizations offer network services that are utilized by various computing applications when performing enterprise-related tasks. These network services may include data storage, video streaming, machine learning, "serverless" computing, and other network services offered using physical and virtual computing resources of one or more data centers. New data centers and other enterprise-related infrastructure, such as regional computing stacks, are often opened or brought online to account for increasing consumer demand in various geographical regions. However, when a new data center or other facility is opened, various network and computing services must be provided to integrate the data center, fulfillment center, or other facility in existing network and computing infrastructure.

Traditionally, to integrate a new facility into existing network and computing infrastructure, an administrator of the new facility creates a service setup and configuration to be sent to individual service teams with a central human coordinator, requesting the central human coordinator perform various tasks to configure computing resources associated with the new facility and otherwise integrate the computing resources in existing infrastructure. However, by doing so, a significant backlog is created and computing resources being provided to new data centers and other facilities is delayed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to centralized and dynamically generated service configurations for data center and region builds. Various enterprises and organizations have computing infrastructure deployed in disparate regions that work in conjunction to offer various computing services and resources. For instance, an enterprise may operate a first data center in Japan to service end users residing in Japan, a second data center in the United States to service end users in the United States, and so forth. In another example, an enterprise may operate a first data center and a second data center that are distributed geographically, but work in conjunction to provide a global web service accessible from any region. As may be appreciated, each data center may include computing infrastructure, such as servers, memory devices, switches, routers, and other computing and network equipment. Additionally, each data center operates software and virtual resources on the physical infrastructure to provide various computing services.

Currently, when a new cloud region is opened or brought online (referred to herein as a "region build"), a service setup and configuration is pushed to individual service teams, requiring a central human coordinator to notify service teams about the new cloud region. This can incur overhead in multiple places, creating significant delays in deploying new computing infrastructure. For instance, overhead is created as a small team of managers must coordinate and organize new cloud region builds by notifying service teams that a new cloud region has been scheduled. Additionally, service teams are required to run and execute various commands to generate configuration and artifacts to set up and run their service in a new region or data center.

According to various embodiments, a centralized registry for service teams to register their configuration generation packages is described. For instance, when a new region or data center is being built or otherwise brought online, the centralized registry may be used to determine what services to dynamically generate service configurations for at the new region or data center. The registry may further monitor for signals that a new region or data center build is occurring and then automatically run commands to generate configurations for services in the new region or data center build.

In the following discussion, a general description of a computing environment for centralized and dynamically generated service configurations and its components is provided, followed by a discussion of the operation of the same.

Figure 1:
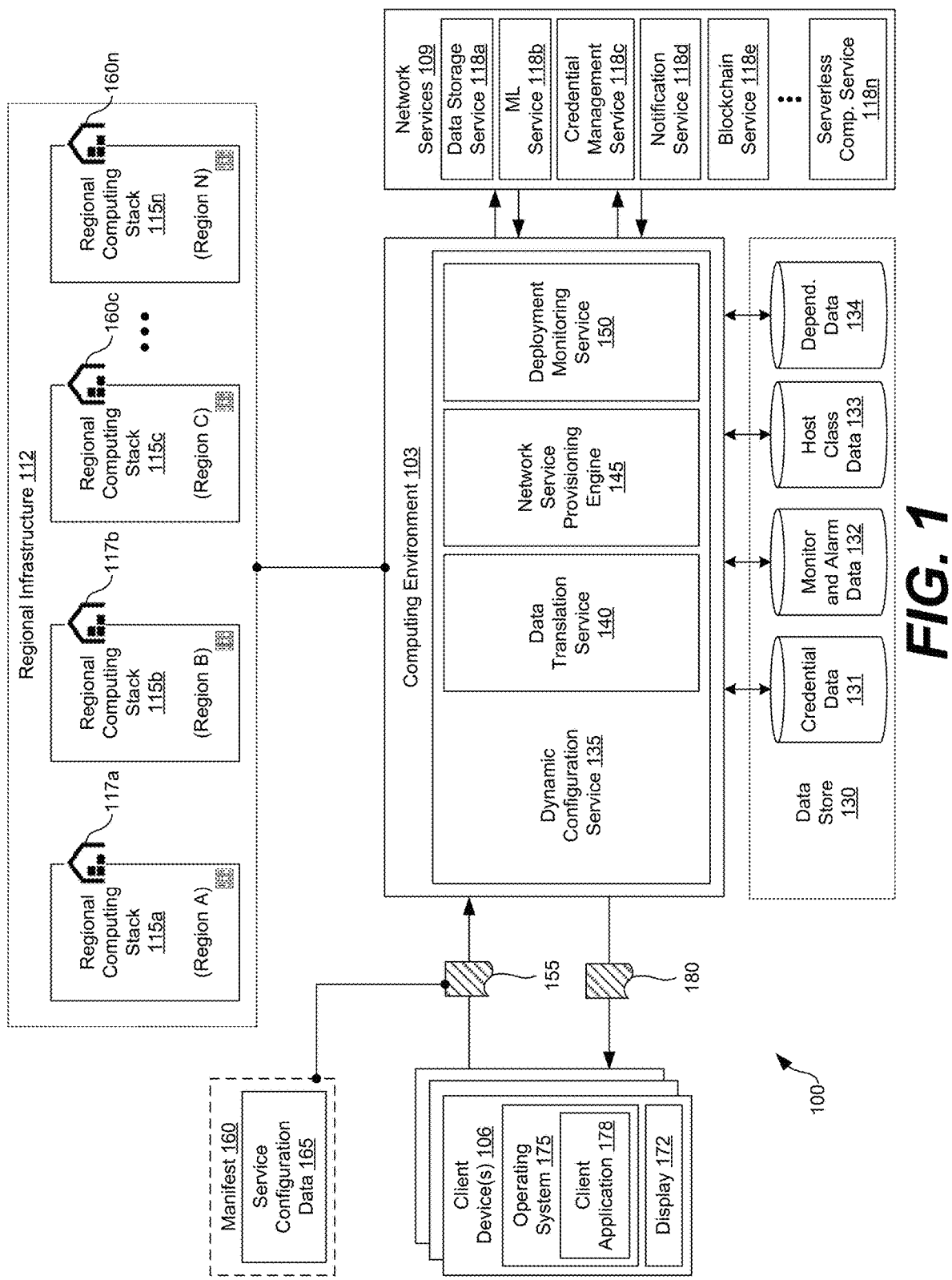
FIG. 1 is a drawing of a networked environment according to various embodiments of the present disclosure.

With reference to FIG. 1, a networked environment 100 is shown according to various embodiments. The networked environment 100 includes a computing environment 103, a client device 106, and network services 109, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse).

This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

Figure 2:
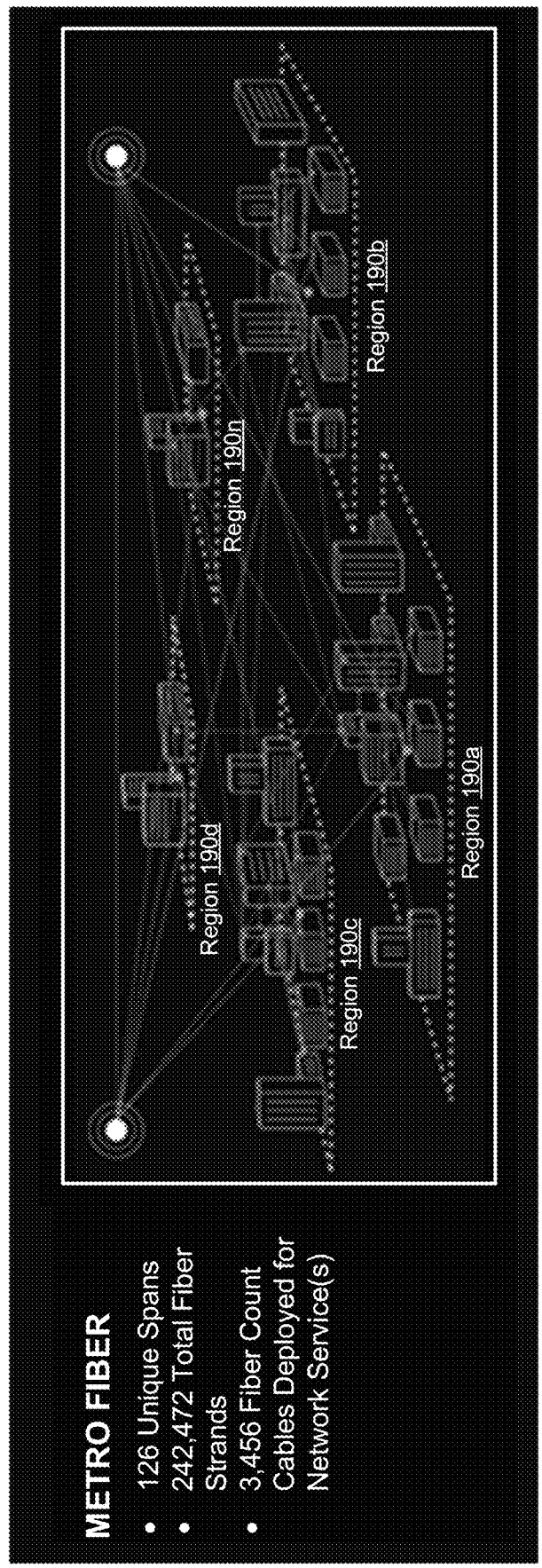
FIG. 2 is an architectural diagram for regions, or cloud regions, offering computing resources in the network environment of FIG. 1 according to various embodiments of the present disclosure.

As shown in FIG. 2, a cloud provider network can be formed as a number of regions 190a . . . 190n, where a region 190 is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone.

A data center refers to a physical building or enclosure that houses and provides power and cooling to servers of the cloud provider network. Preferably, availability zones within a region 190 are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region 190 can operate two or more TCs for redundancy. Regions 190 may be connected to a global network which includes private networking infrastructure (e.g., fiber connections controlled by the cloud provider) connecting each region 190 to at least one other region 190. The cloud provider network may deliver content from points of presence outside of, but networked with, these regions 190 by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. When a new region 190 is brought online, it can run its own copies of each desired service.

Referring back to FIG. 1, in instances in which computing devices of the computing environment 103 are distributed in different geographical regions 190 or locations, the computing devices may make up regional infrastructure 112. For instance, one or more computing devices or other computing infrastructure may form one or more regional computing stacks 115a . . . 115n (collectively "regional computing stacks 115"). Each of the regional computing stacks 115 may serve a region 190, such as a country or portion of a country, as can be appreciated to account for demand of computing services or to provide consumers with various goods. As such, the regional computing stacks 115 may include those physically located in a facility 117a . . . 117n (collectively "facilities 117"), where the facility 117 may include a data center or other installation as may be appreciated.

In one example, a first regional computing stack 115a may provide electronic commerce-related web services that serve consumers in Australia, whereas a second regional computing stack 115b provides database storage web services for the Western portion of the United States. In another example, even though the regional computing stacks 115 are distributed geographically, they may work in conjunction to provide a web service accessible from any region 190.

As may be appreciated, each regional computing stack 115 may include physical computing infrastructure, such as servers, memory devices, switches, routers, and other computing and network equipment. Additionally, each regional computing stack 115 may operate software and virtual resources on the physical infrastructure to provide various computing services, as will be described.

The network services 109 may include web services in some examples that can be invoked using a network service call made to an application programming interface (API). An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The network services 109 may be independent of the computing environment 103 in some examples, and may be operated by a third-party. Alternatively, the network services 109 may be a portion of the computing environment 103, and may be maintained and operated by a common entity. In some embodiments, the regional computing stacks 115 include regional infrastructure 112 for serving up the network services 109.

In various embodiments, the network services 109 may include a data storage service 118a, a machine learning (ML) service 118b, a credential management service 118c, a notification service 118d, a blockchain service 118e, a serverless computing service 118n, video streaming services, as well as other types of network services 109 as can be appreciated.

Various applications and/or other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

Some of the data stored in the data store 130 may include credential data 131, monitor and alarm data 132, hostclass data 133, dependency data 134, as well as other data. Credential data 131 may include usernames, passwords, unique identifiers, tokens, as well as other information that may be used by a regional computing stack 115, or other computing device, in accessing a network service 109.

Monitor and alarm data 132 may include monitors and alarms created by the computing environment 103 in association with the network services 109. For instance, when utilizing a data storage service 118a, the computing environment 103 may create a monitor to ensure that data stored on the network service 109 does not exceed a predetermined threshold (e.g., 90%, 95%, or 100%). If the predetermined threshold has been reached, the computing environment 103 may trigger an alarm, which may include notifying an administrator that the predetermined threshold has been exceeded, allocate additional memory, or other action as may be appreciated.

The components executed on the computing environment 103, for example, include a dynamic configuration service 135. The dynamic configuration service 135 may include a data translation service 140, a network service provisioning engine 145, a deployment monitoring service 150, and other applications, services, processes, systems, engines, or functionality not discussed in detail herein.

The dynamic configuration service 135 is executed in the computing environment 103 to oversee automatic configuration of regional computing stacks 115 when coming online, as well as computing services the regional computing stacks 115 provide. In some embodiments, the dynamic configuration service 135 receives a request 155 to dynamically configure a regional computing stack 115. The dynamic configuration service 135 may parse the request 155 to identify how to configure the regional computing stack 115 based on resources required by the regional computing stack 115.

In various embodiments, the request 155 may include a manifest 160. The manifest 160 may include service configuration data 165, which may include desired services, configuration, parameters, resources, as well as other information requested to be provided to the regional computing stack 115 or service offered by the regional computing stack 115.

In some embodiments, an administrator or other end user of a client device 106 may perform an ingestion process to specify the service configuration data 165, where the ingestion process comprises a series of one or more user interfaces that receive a specification of the computing resources requested for the regional computing stack 115. In some embodiments, the ingestion process may receive the service configuration data 165, or other data, as an infrastructure-as-code (IaC) definition. IaC definitions may include code that can be executed by the dynamic configuration service 135 automatically in some embodiments.

In further embodiments, the dynamic configuration service 135 may identify computing resources of the computing environment 103 required to deploy a new regional computing stack 115. Further, the dynamic configuration service 135 may determine an order of creation or an order of allocation of the computing resources. To create or allocate resources, in some embodiments, the dynamic configuration service 135 may create at least one virtual process that automatically allocates the computing resources for the new regional computing stack 115 based on the determined order of creation or allocation.

To determine an order of creation or allocation, the dynamic configuration service 135 may identify dependencies from the manifest 160. For instance, if a manifest 160 requests a data storage service 118a be provided to a regional computing stack 115, the dynamic configuration service 135 may identify that the data storage service 118a requires access to the credential management service 118c in order to obtain suitable credentials to access the data storage service 118a.

To this end, the dynamic configuration service 138 may identify one or more resources to be utilized by the new regional computing stack 115 and may determine that the one or more resources rely on another (potentially non-existing) resource. The resource may include a network service 109, a credential, or other information as may be appreciated.

The data translation service 140 is executed in the computing environment 103 to translate data from one format to another. For instance, if a portion of the service configuration data 165 is in a JSON format, the data translation service 140 may convert the service configuration data 165 to an extensible markup language (XML) format, if required by one of the network services 109.

The network service provisioning engine 145 is executed in the computing environment 103 to provide network services 109 on behalf of the regional computing stack 115 or other computing infrastructure being deployed. In some embodiments, to provision a network service 109, the network service provisioning engine 145 may perform managed resource creation, which may include creating a web service account, generating or obtaining credentials for the web service account, and configuring a network service 109 such that it can be utilized by a regional computing stack 115. It is understood that the network service provisioning engine 145 may perform other tasks necessary to provide one or more of the network services 109 to a regional computing stack 115.

The deployment monitoring service 150 is executed in the computing environment 103 to monitor deployment of resources for the regional computing stacks 115 or other computing services. For instance, when the dynamic configuration service 135 spawns a virtual process to configure a regional computing stack, the deployment monitoring service 150 may observe states of the virtual process as it creates and configures resources. The dynamic configuration service 135 may provide an administrator or other end user of the client device 106 with updated statuses for the creation or allocation of resources.

The client device 106 is representative of a plurality of client devices that may be coupled to the network. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may comprise, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may include an operating system 175 configured to execute various applications, such as a client application 178, and/or other applications. The client application 178 may be executed in a client device 106, for example, to access network content served up by the computing environment 103 and/or other servers, thereby rendering a user interface on the display 172. To this end, the client application 178 may comprise, for example, a browser, a dedicated application, etc., and a user interface may comprise a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, the dynamic configuration service 135 may act as a central registry to receive requests 155 to deploy one or more new regional computing stacks 115 in the computing environment 103. It is understood that, in some embodiments, individual ones of the requests 155 may originate from different geographical regions 190. Further, in some embodiments, individual ones of the requests 155 may include package files comprising a manifest 160.

When a request 155 is received, the dynamic configuration service 135 can analyze the manifest 160, as well as other data, to identify the computing resources required for a corresponding one of the regional computing stacks 115. In some embodiments, the computing resources are specified in the manifest 160. In other embodiments, the dynamic configuration service 135 may determine resources that are required to be provided to the regional computing stack 115 even if not explicitly specified in the manifest 160.

Further, in various embodiments, the dynamic configuration service 135 may determine an order of creation of the computing resources specified in the manifest 160. In some embodiments, the order of creation is determined based at least in part on a dependency identified from the computing resources requested to be created or allocated in the manifest 160. For instance, if the manifest 160 requests access to a machine learning service 118b, and the machine learning service 118b requires a data storage service 118a, access to the data storage service 118a can be created prior to that of the machine learning service 118b.

Dependencies may be identified or otherwise determined using dependency data 134 accessed from the data store 130. For example, for a given one of the network services 109, dependency data 134 can include dependent resources for the given one of the network services 109. The dynamic configuration service 135 may thus consult with the dependency data 134 to determine whether a computing resource requested in a manifest has any dependencies, if not specified in the manifest 160.

For individual ones of the requests 155 received from various ones of the regional computing stacks 115, the dynamic configuration service 135 can create one or more virtual processes that automatically configure, create, or allocate computing resources for the regional computing stacks 115, for instance, according to the order of creation. In some embodiments, the dynamic configuration service 135 can spawn a thread, virtual machine, fork, or other virtual process that iterates through computing resources requested in the manifest 160 until completion. Thereafter, the virtual process can be terminated to make space available for new requests 155.

In various embodiments, the dynamic configuration service 135 may monitor the virtual process while configuration of the new regional computing stack 115 is occurring. For instance, as the virtual process iterates through creation, allocation, and/or configuration of computing resources requested in the manifest 160, the deployment monitoring service 150 can monitor a state of the iteration. In some embodiments, the deployment monitoring service 150 may provide the client device 106 with a current state of creation (e.g., a percentile such as 80%), an estimated time of completion (e.g., two hours until completion), or other metric. Upon completion, the dynamic configuration service 135 may deploy the new regional computing stack 115 and/or send a notification 180 to the client device 106 upon completion.

While embodiments described herein relate to the creation, configuration, and deployment of regional computing stacks 115, in other embodiments, the dynamic configuration service 135 may instead create, configure, and deploy various computing services, such as one or more network services hosted on the regional computing stacks 115. In any event, to create or configure a regional computing stack 115 or other computing resource, the dynamic configuration service 135 may perform one of generating a shared internal deployment environment configured to deploy a computing service across a plurality of computing devices; creating a web service account for at least one of a plurality of web services; performing load balancing; creating at least one user group; generating at least one web service credential; and configuring secure socket layer (SSL) certificates. In further embodiments, the dynamic configuration service 135 may assign logical user roles, generate policies, and make resources internal to an enterprise available to users in a user group.

Figure 3:
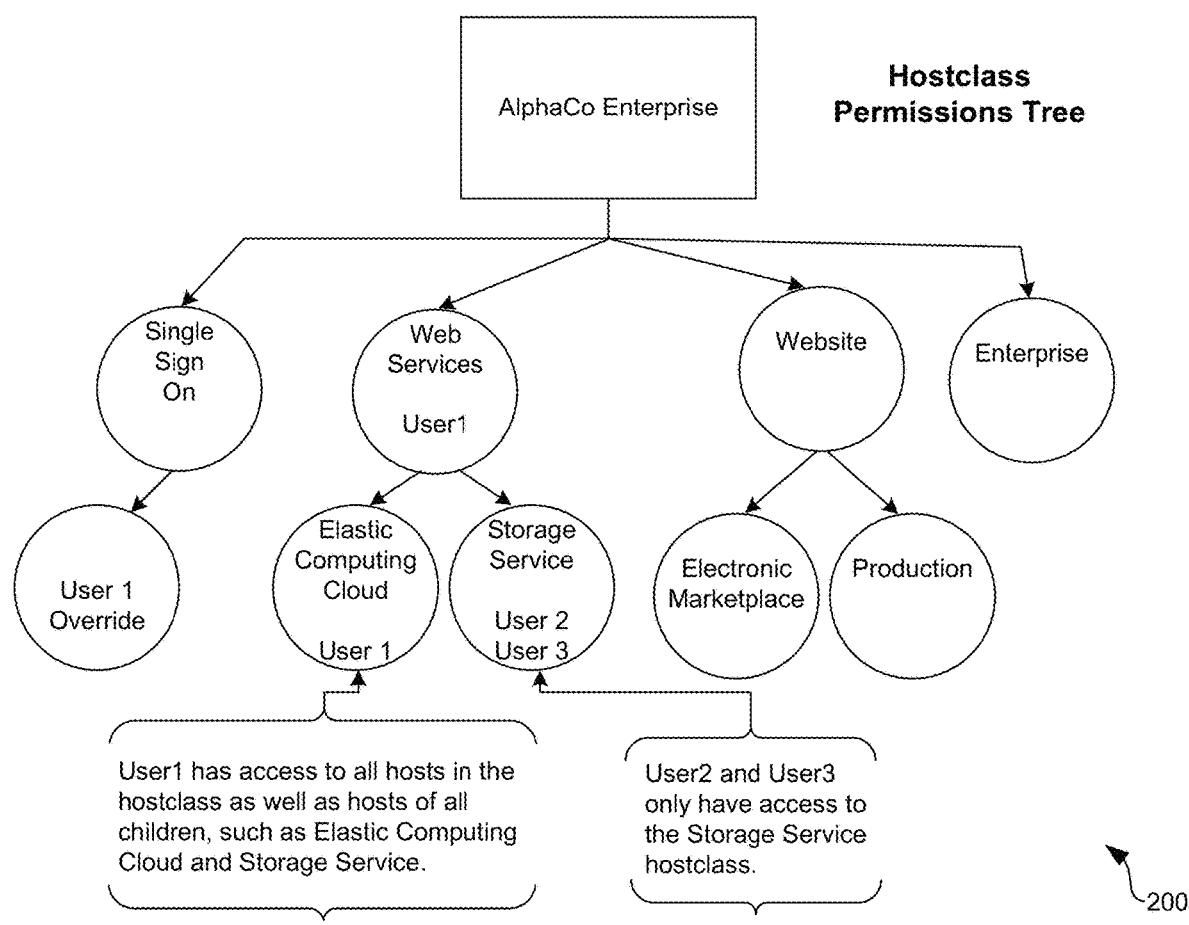
FIG. 3 is an architectural diagram for a hostclass permission tree according to various embodiments of the present disclosure.

In further embodiments, to create or configure a regional computing stack 115 or other computing resource, the dynamic configuration service 135 may generate a hostclass for each of the new regional computing stacks 115. Referring now to FIG. 3, an example architectural diagram 200 is shown for an example of a hostclass permission tree. A hostclass may include a virtual container for a set of host computing devices, such as server computing devices in the computing environment 103. The architectural diagram 200 can represent a set of packages required for the computing environment 103 to fulfill a particular function.

For instance, a first hostclass, "AlphaCo Enterprise," is a primary hostclass and "Single Sign On," "Web Services," "Website," and "Enterprise" are child hostclasses. An example of an environment may include the "Website" hostclass, which may contain a particular package group. The "Production" stage of the environment may deploy to a US-ONLINE hostclass, for example. In some embodiments, environments are hierarchical and, as such, and they inherit package groups from the environments above. For example, a "RetailWebsite/US" environment may be a child of a "RetailWebsite" environment. Each environment may have a current set of package versions associated therewith.

When a request 155 is received, the manifest 158 may be analyzed to determine which hostclass to assign to a requesting one of the new regional computing stacks 115. For instance, if a regional computing stack 115 is added to create additional capacity for website-related functions, the dynamic configuration service 135 may assign the "Website" hostclass to the regional computing stack 115. The regional computing stack 115 will have permissions to access information residing in the "Electronic Marketplace" and "Production" hostclasses, but will not have permitted to access the "Web Services" hostclass and other hostclasses.

Figure 4:
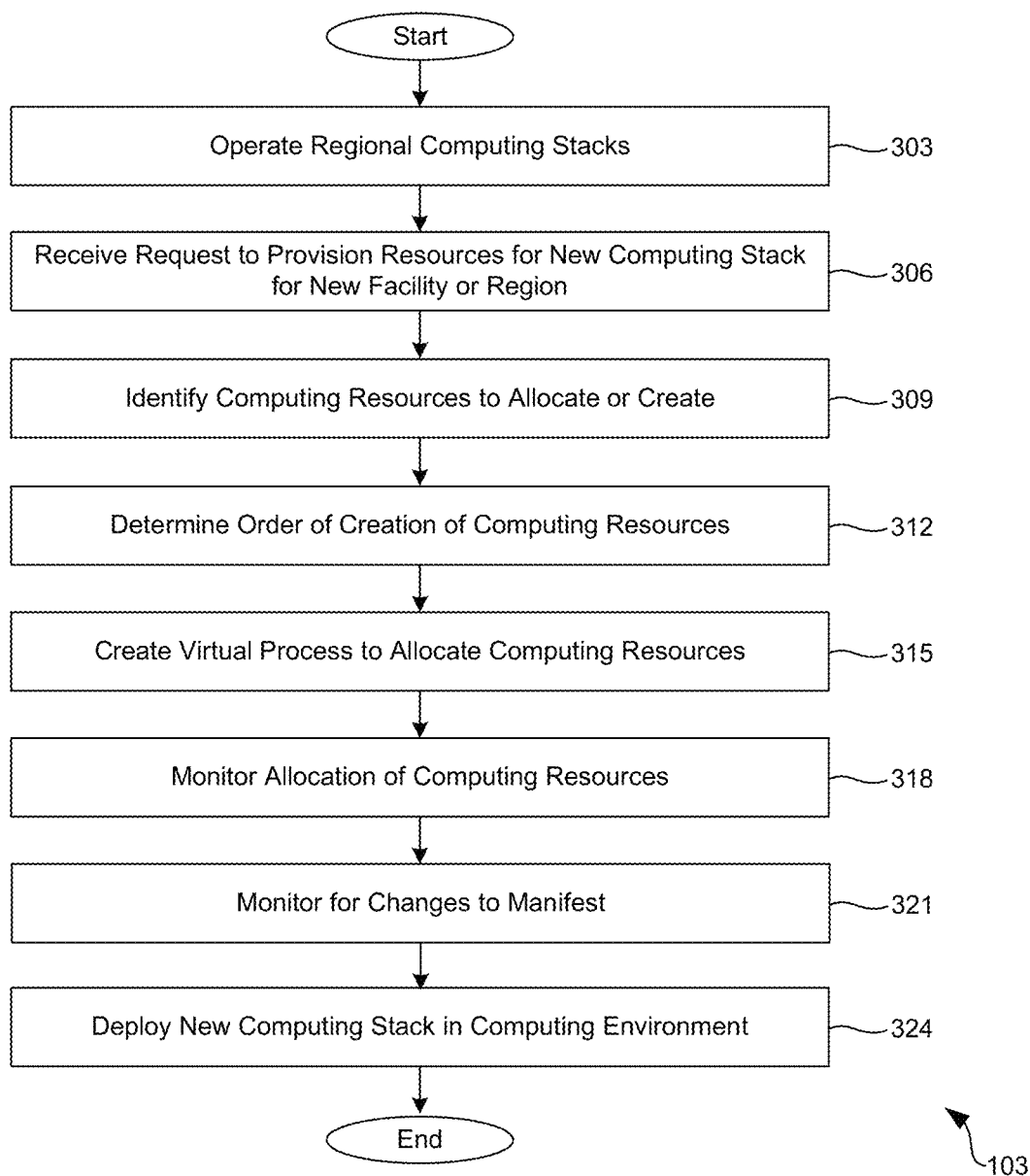
FIGS. 4-6 are flowcharts illustrating functionality executed in a computing environment of the networked environment of FIG. 1 according to various embodiments of the present disclosure.

Moving on to FIG. 4, shown is a flowchart that provides one example of the operation of a portion of the dynamic configuration service 135 according to various embodiments. It is understood that the flowchart of FIG. 4 provides merely an example of the many different types of functional arrangements that may be employed to implement the operation of the portion of the dynamic configuration service 135 as described herein. As an alternative, the flowchart of FIG. 4 may be viewed as depicting an example of elements of a method implemented in the computing environment 103 according to one or more embodiments.

Beginning with 303, the dynamic configuration service 135 may oversee operation of regional computing stacks 115 where each of the regional computing stacks 115 may serve different regions and/or may be located in different regions 190. In some embodiments, the regional computing stacks 115 are installed or otherwise located in a data center or other facility 117 as may be appreciated. It is understood that, as new data centers and other facilities 117 are opened to increase capacity or service demand, new regional computing stacks 115 must be deployed to service the new facilities 117.

In 306, the dynamic configuration service 135 can receive one or more requests 155 to deploy one or more new regional builds or, in other words, deploy new regional computing stacks 115 in the computing environment 103. In some embodiments, the new regional computing stacks 115 are brought online with the opening of a new facility 117, such a data center or other facility 117. In various embodiments, individual ones of the requests 155 may originate from different geographical regions 190. Also, in some embodiments, individual ones of the requests 155 may include package files comprising a manifest 160.

In 309, the dynamic configuration service 135 can analyze the manifest 160, as well as other data, to identify the computing resources to be created or allocated for a corresponding one of the regional computing stacks 115. In some embodiments, the computing resources are specified in a manifest 160 and/or the dynamic configuration service 135 may identify resources that are required to be provided to the regional computing stack 115 even if not explicitly specified in the manifest 160.

Next, in 312, the dynamic configuration service 135 may determine an order of creation, configuration, and/or allocation of the computing resources, such as those identified in 309. In some embodiments, the dynamic configuration service 135 may determine the order of creation based at least in part on a dependency identified from the computing resources requested to be created or allocated in the manifest 160. For instance, if the manifest 160 requests access to a video streaming service, and the video streaming service requires access to an account of the data storage service 118a, access to the data storage service 118a can be obtained prior to that of the video streaming service.

In 315, for individual ones of the requests 155 received from various ones of the regional computing stacks 115, the dynamic configuration service 135 can create one or more virtual processes that automatically configure, create, or allocate computing resources for the regional computing stacks 115, for instance, according to the order of creation. In some embodiments, the dynamic configuration service 135 can spawn a thread, virtual machine, fork, or other virtual process that iterates through computing resources requested in the manifest 160 until completion.

In some embodiments, the virtual process may create, configure, or allocate computing resources for a regional computing stack 115 or other computing resource by generating a shared internal deployment environment configured to deploy a computing service across a plurality of computing devices, creating a web service account for at least one of a plurality of web services, performing load balancing, creating at least one user group, generating at least one web service credential, and configuring secure socket layer (SSL) certificates. In further embodiments, the dynamic configuration service 135 may assign logical user roles, generate policies, and make resources internal to an enterprise available to users in a user group.

In further embodiments, the virtual process may create, configure, or allocate computing resources for a regional computing stack 115 or other computing resource by generating a hostclass for each of the new regional computing stacks 115, where the hostclass includes a class, data object, or other virtual container for a set of host computing devices, such as server computing devices in the computing environment 103. The hostclass may inherit permissions from parent hostclasses in some embodiments.

Next, in 318, the dynamic configuration service 135 may monitor the virtual process while configuration of the new regional computing stack 115 is occurring. For instance, as the virtual process iterates through creation, configuration, and/or allocation, configuration of computing resources requested in the manifest 160, the deployment monitoring service 150 may monitor a state of the iteration. For instance, the deployment monitoring service 150 may provide the client device 106 with a current state of creation (e.g., a percentile between 0% and 100%, such as 75%), an estimated time of completion (e.g., three days until completion), or other suitable status.

In 321, the dynamic configuration service 135 may monitor for changes to the manifest 160 or other modifications that may have occurs while a virtual process configures and deploys a new region build. For instance, the dynamic configuration service 135 may identify that an administrator changed service configuration data 165 in a manifest 160 while a regional computing stack 115 is being configured, referred to as an "out-of-band" configuration. To this end, in some embodiments, the dynamic configuration service 135 may configure the regional computing stack 115 according to the changes detected from the administrator or may await until completion to apply the changes, if possible.

In some embodiments, an administrator or team of users may register a manifest 160 at any time, even during configuration of a new regional computing stack 115. The dynamic configuration service 135 may detect a "drift", or a change between a manifest 160 currently being used to configure the new regional computing stack 115 with a modified form of the manifest 160. Based on detection of a drift, the dynamic configuration service 135 may allocate change resources or allocate new resources, which may be performed until all resources have been created. Accordingly, in some embodiments, an administrator may register program code that creates a manifest 160, where the manifest 160 is derived from the program code repeatedly, even though the program code is subject to revisions or alternations. In some embodiments, when a change to a manifest 160 or other drift is detected while a regional computing stack 115 is being configured, the administrator may be prompted on the client device 106 to determine whether or not to continue with a change. In some embodiments, the dynamic configuration service 135 includes a watchdog or other virtual process that periodically compares a manifest 160 being utilized to configure a regional computing stack 115 to a current version of a manifest 160.

In 324, upon completion of the creation, configuration, and/or allocation of computing resources, the dynamic configuration service 135 may deploy the new regional computing stack 115. Further, in some embodiments, the dynamic configuration service 135 may send a notification 180 to the client device 106 upon completion.

In further embodiments, the dynamic configuration service 135 may generate monitor and alarm data 132, which may include monitors and alarms created by the computing environment 103 in association with the network services 109. For instance, when utilizing a machine learning service 118b, the computing environment 103 may create a monitor to ensure that a computation time of a task given to the machine learning service 118b does not exceed a predetermined threshold, such as one week, month, year, etc. However, if the predetermined threshold has been reached, the computing environment 103 may trigger an alarm, which may include notifying an administrator that the predetermined threshold has been exceeded or other action, as may be appreciated. Thereafter, the process may proceed to completion.

Figure 5:
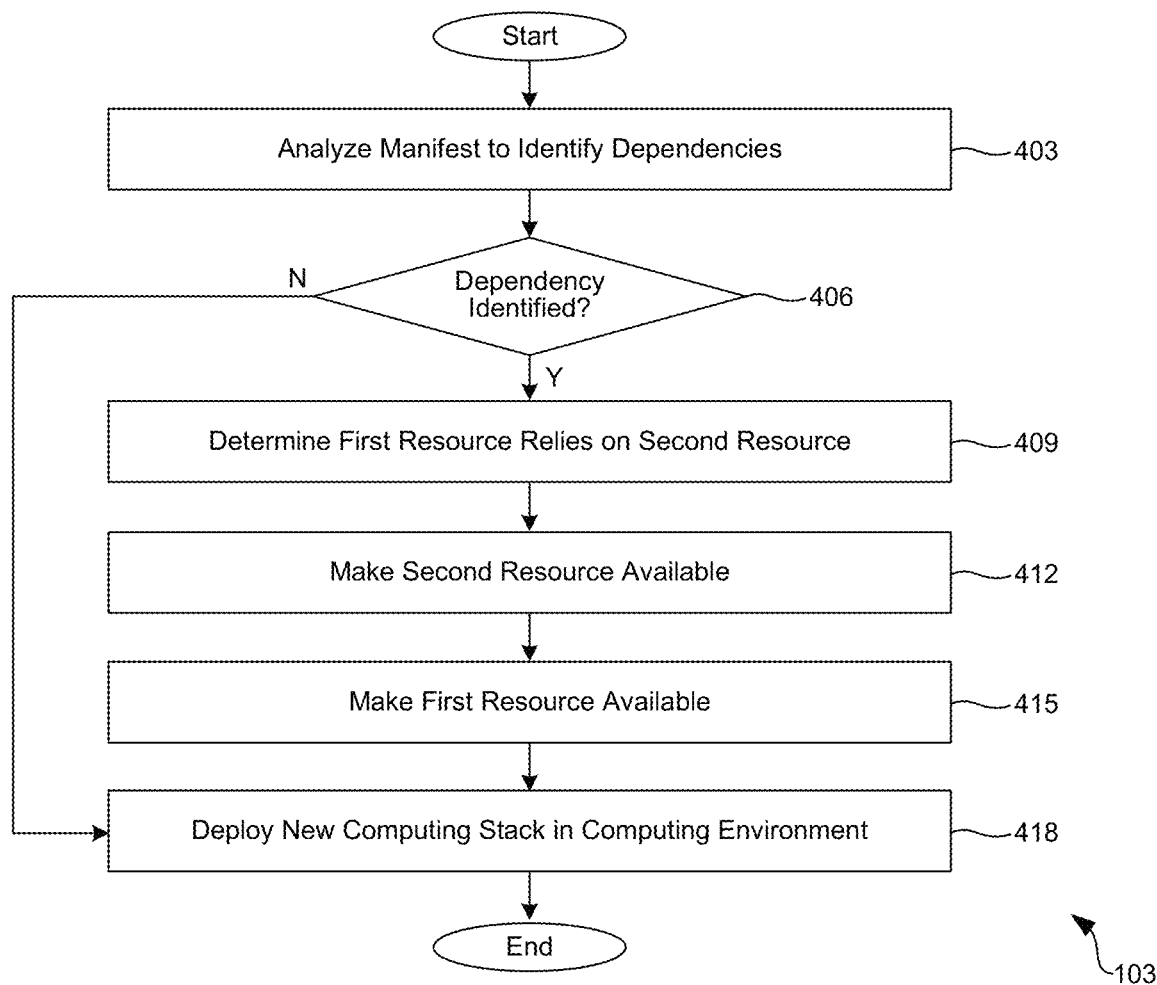

Turning now to FIG. 5, shown is a flowchart that provides one example of the operation of a portion of the dynamic configuration service 135 according to various embodiments. It is understood that the flowchart of FIG. 5 provides merely an example of the many different types of functional arrangements that may be employed to implement the operation of the portion of the dynamic configuration service 135 as described herein. As an alternative, the flowchart of FIG. 5 may be viewed as depicting an example of elements of a method implemented in the computing environment 103 according to one or more embodiments.

In 403, the dynamic configuration service 135 may analyze a manifest 160 to identify one or more dependencies. Dependencies may include a resource required by a computing resource, such as a required credential, service, or permission. In some embodiments, the order of creation of the computing resources for a regional computing stack 115 may be determined based on a dependency identified from the manifest 160. For instance, if the manifest 160 requests access to a blockchain service 118e, and the blockchain service 118 requires data to be encrypted using a particular credential, the credential can be generated or otherwise obtained prior to instantiating the blockchain service 118e.

In various embodiments, the dynamic configuration service 135 may identify dependencies using dependency data 134 accessed from the data store 130. For example, for a given one of the network services 109, dependency data 134 can include dependent resources for the given one of the network services 109. The dynamic configuration service 135 may thus consult with the dependency data 134 to determine whether a computing resource requested in a manifest has any dependencies, if not specified in the manifest 160.

Accordingly, in 406, the dynamic configuration service 135 may determine whether a dependency was identified, for instance, based on an analysis of the manifest 160. If a dependency is identified, the process may proceed to 409. Otherwise, if a dependency is not identified, the process may advance to 418, as will be discussed.

Referring first to 409, if a dependency has been identified, the dynamic configuration service 135 may determine that a first resource as requested by the manifest 160 relies on a second resource. In other words, the dynamic configuration service 135 may determine whether a resource specified in a manifest 160 or otherwise requested to be provisioned is dependent on another resource.

As such, in 412, the dynamic configuration service 135 can make the second resource available, for instance, prior to making the first resource available. In some scenarios, it is understood that the second resource can be dependent on another resource. As such, resources can be obtained based on dependencies until a requisite number of resources has been obtained to sufficient provide access to the first resource.

In 415, the dynamic configuration service 135 can make the first resource available, for instance, to the new regional computing stack 115. In some embodiments, this may include enabling or providing a new regional computing stack 115 with access to a network service 109, storing data in the data store 130 for access by the regional computing stack 115, providing the regional computing stack 115 with a credential, enabling load balancing between hosts of the computing environment 103, or other task as may be appreciated.

In 418, the dynamic configuration service 135 can deploy the new regional computing stack 115 in the computing environment 103, if applicable. For instance, in some embodiments, a new regional computing stack 115 may be added in a data center to provide additional computing resources. As such, the new regional computing stack 115 may be brought online such that it can utilize any computing services made available in 412, 415, etc.

Figure 6:
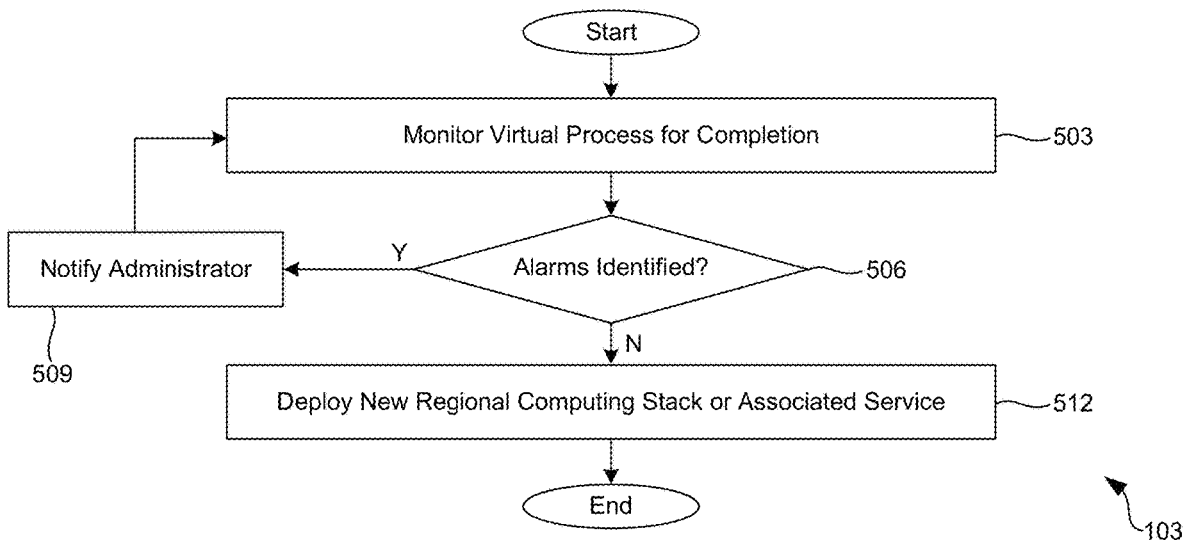

Referring next to FIG. 6, a flowchart is shown that provides another example of the operation of a portion of the dynamic configuration service 135 according to various embodiments. It is understood that the flowchart of FIG. 6 provides merely an example of the many different types of functional arrangements that may be employed to implement the operation of the portion of the dynamic configuration service 135 as described herein. As an alternative, the flowchart of FIG. 6 may be viewed as depicting an example of elements of a method implemented in the computing environment 103 according to one or more embodiments.

Beginning with 503, the dynamic configuration service 135 may monitor deployment of resources for the regional computing stacks 115 or other computing resources. For instance, when the dynamic configuration service 135 spawns a virtual process to configure a regional computing stack, the deployment monitoring service 150 may observe the progression of states of the virtual process as it creates and configures resources. The dynamic configuration service 135 may provide an administrator or other end user of the client device 106 with updated statuses for the creation or allocation of resources. For instance, the computing environment 103 may generate a series of one or more user interfaces accessible on the client device 106 to monitor deployment of a new regional computing stack 115 or other region build out.

In 506, the dynamic configuration service 135 may determine whether any alarms were identified prior to completion of the virtual process. For instance, if any resources were not able to successfully be created or configured, an alarm may be set. If one or more alarms are identified, the process may proceed to 509. Otherwise, the process may proceed to 512.

In 509, the dynamic configuration service 135 may generate a communication to notify an administrator of the alarm such that the administrator can take action to alleviate an underlying cause of the alarm. In further embodiments, the deployment configuration service 135 may identify an action to take to alleviate the alarm and, if the action is determined, automatically perform the action to alleviate the alarm. Thereafter, the process may revert to 503 to continue monitoring the virtual process until completion.

In 512, in an instance in which no alarms are identified, the dynamic configuration service 135 may deploy the new regional computing stack 115 or associated service. Thereafter, the process may proceed to completion.

Figure 7:
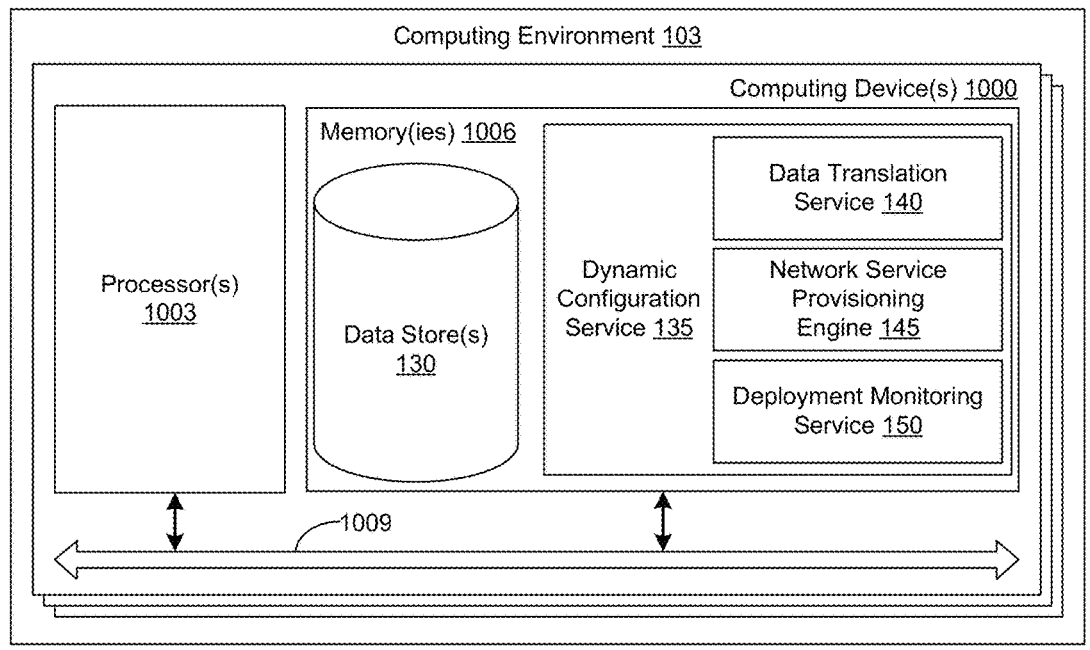
FIG. 7 is a schematic block diagram illustrating a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 1000. Each computing device 1000 includes at least one processor circuit, for example, having a processor 1003 and a memory 1006, both of which are coupled to a local interface 1009. To this end, each computing device 1000 may comprise, for example, at least one server computer or like device. The local interface 1009 may comprise, for example, a data bus with an accompanying address/control bus or other bus structure as may be appreciated.

Stored in the memory 1006 are both data and several components that are executable by the processor 1003. In particular, stored in the memory 1006 and executable by the processor 1003 are the dynamic configuration service 135, the data translation service 140, the network service provisioning engine 145, the deployment monitoring service 150, and potentially other applications. Also stored in the memory 1006 may be the data store 130 and other data. In addition, an operating system may be stored in the memory 1006 and executable by the processor 1003.

It is understood that there may be other applications that are stored in the memory 1006 and are executable by the processor 1003 as may be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that may ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 903 and/or multiple processor cores and the memory 1006 may represent multiple memories 906 that operate in parallel processing circuits, respectively. In such a case, the local interface 1009 may be an appropriate network that facilitates communication between any two of the multiple processors 903, between any processor 1003 and any of the memories 906, or between any two of the memories 906, etc. The local interface 1009 may comprise additional systems designed to coordinate this communication, including, for example, performing load balancing. The processor 1003 may be of electrical or of some other available construction.

Although the dynamic configuration service 135, the data translation service 140, the network service provisioning engine 145, the deployment monitoring service 150, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the dynamic configuration service 135, the data translation service 140, the network service provisioning engine 145, and/or the deployment monitoring service 150. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dynamic configuration service 135, the data translation service 140, the network service provisioning engine 145, and the deployment monitoring service 150, that comprise software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the dynamic configuration service 135, the data translation service 140, the network service provisioning engine 145, and the deployment monitoring service 150, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   program instructions stored in memory and executable in the at least one computing device that, when executed, direct the at least one computing device to:
   receive a plurality of requests in a dynamic configuration service to deploy one of a plurality of new regional computing stacks in a computing environment in different geographical regions, individual ones of the requests comprising a manifest describing service configuration data;
   identify computing resources required for a corresponding one of the new regional computing stacks as specified in the corresponding manifest;
   determine an order of creation of the computing resources, wherein the order of creation is determined based at least in part on a dependency specified in the corresponding manifest;
   for individual ones of the requests, create at least one virtual process that automatically configures the corresponding one of the new regional computing stacks according to the order of creation, wherein, for at least one of the new regional computing stacks, the at least one virtual process generates a plurality of hierarchal hostclasses having a set of packages required for the at least one of the new regional computing stacks, at least a portion of the hostclasses inheriting a package from a predefined parent hostclass, and wherein generating the plurality of hierarchal hostclasses further comprises examining the parent hostclass and selecting portions of the parent hostclass required for the at least one of the new regional computing stacks as specified in the corresponding manifest;
   configuring, by the at least one virtual process, the corresponding one of the new regional computing stacks;
   while configuration of the corresponding one of the new regional computing stacks is occurring, detect a change between the corresponding manifest being used to configure a respective one of the regional computing stacks and a modified manifest;
   based at least in part on detection of the change, allocate new computing resources based on the modified manifest and continuing the configuration of the corresponding one of the new regional computing stacks including configuring the new computing resources specified in the modified manifest;

send a notification to a respective device upon completion of configuration of each of the new regional computing stacks; and deploy the new regional computing stacks on the respective device.

2. The system of claim 1, wherein the new regional computing stack is further configured by performing at least one of: (i) generating a shared internal deployment environment configured to deploy a computing service across a plurality of computing devices; (ii) creating a web service account for at least one of a plurality of web services; (iii) performing load balancing; (iv) creating at least one user group; or (v) generating at least one web service credential.

3. The system of claim 1, wherein the dependency is identified by:

identifying a first resource to be utilized by the new regional computing stack from each corresponding manifest;

determining that the first resource relies on a second resource; and allocating the first resource and the second resource, the second resource being allocated prior to the first resource.

4. A system, comprising:

at least one computing device; and program instructions stored in memory and executable in the at least one computing device that, when executed by the at least one computing device, direct the at least one computing device to:

receive a plurality of requests from different geographical regions at a central service, individual ones of the requests corresponding to a new computing service to be deployed in a new one of a plurality of regional computing stacks, each of the geographical regions being served by a respective one of the regional computing stacks, and each of the requests comprising a manifest describing a described configuration of the new computing service in the new one of the regional computing stacks;

for the individual ones of the requests, identify computing resources of a computing environment required to deploy the new computing service based at least in part on the manifest describing service configuration data;

create at least one virtual process that automatically performs an allocation of the computing resources for the new computing service based on a predetermined order of allocation and changes the allocation of the computing resources based at least in part on a change to the manifest identified during the allocation of the computing resources, wherein, for at least one of the new regional computing stacks, the at least one virtual process generates a plurality of hierarchal hostclasses having a set of packages requires for the at least one of the new regional computing stacks, at least a portion of the hostclasses inheriting a package from a parent one of the hostclasses, and wherein generating the plurality of hierarchal hostclasses further comprises examining the parent hostclass and selecting portions of the parent hostclass required for the at least one of the new regional computing stacks as specified in the manifest;

send a notification to a respective device upon completion of configuration of each of the new regional computing stacks;

configure, by the at least one virtual process, the corresponding one of the new regional computing stacks; and deploy the new computing service upon completion of the at least one virtual process.

5. The system of claim 4, wherein the at least one computing device is further directed to:

monitor the at least one virtual process while the computing resources are allocated; and send a notification in response to the new computing service being deployed.

6. The system of claim 4, wherein the new computing service to be deployed is a new computing stack associated with bringing online a data center.

7. The system of claim 6, wherein the computing resources required by the new computing stack are allocated by performing at least one of: (i) generating a shared internal deployment environment configured to deploy a computing service across a plurality of computing devices; (ii) creating a web service account for at least one of a plurality of web services; (iii) performing load balancing; (iv) creating at least one user group; or (v) generating at least one web service credential.

8. The system of claim 7, wherein the computing resources required by the new computing stack are allocated by:

generating a hostclass for the new computing stack corresponding to the individual ones of the requests, the hostclass comprising a virtual container for a set of host computing devices that shares the shared internal deployment environment.

9. The system of claim 4, wherein the predetermined order of allocation is determined by the at least one computing device in response to an identification of a dependency during an analysis of each corresponding manifest.

10. The system of claim 9, wherein the dependency is identified from each corresponding manifest by:

identifying at least one resource to be utilized by the new computing stack; and determining that the at least one resource relies on at least one other non-existing resource.

11. The system of claim 10, wherein each corresponding manifest is generated in response to an ingestion process, wherein the ingestion process comprises at least one user interface configured to receive a specification of the computing resources as an infrastructure-as-code (IaC) definition.

12. A computer-implemented method, comprising:

receiving, by at least one computing device comprising at least one hardware processor, a plurality of requests at a central service, individual ones of the requests identifying a new computing stack to be deployed in a geographical region of a computing environment;

for the individual ones of the requests, identifying, by the at least one computing device, computing resources of the computing environment required to deploy the new computing stack, wherein the computing resources of the computing environment required to deploy the new computing stack are identified from a manifest corresponding to a respective one of the requests, each corresponding manifest describing service configuration data;

determining, by the at least one computing device, an order of creation of the computing resources, wherein the order of creation is determined based at least in part on a dependency specified in each corresponding manifest;

creating, by the at least one computing device, at least one virtual process that automatically allocates the computing resources for the new computing stack based on a predetermined order of creation, wherein, for at least one of the new regional computing stacks, the at least one virtual process generates a plurality of hierarchal hostclasses having a set of packages requires for the at least one of the new regional computing stacks, at least a portion of the hostclasses inheriting a package from a predefined parent hostclasses, and wherein generating the plurality of hierarchal hostclasses further comprises examining the parent hostclass and selecting portions of the parent hostclass required for the at least one of the new regional computing stacks as specified in the corresponding manifest;

configuring, by the at least one virtual process, the corresponding one of the new regional computing stacks;

monitoring, by the at least one computing device, the corresponding manifest to identify at least one change to the corresponding manifest while the at least one virtual process is allocating the computing resources;

in response to the at least one change to each corresponding manifest being identified, allocate additional computing resources based at least in part on the at least one change;

sending a notification to a respective device upon completion of configuration of each of the new regional computing stacks; and deploying, by the at least one computing device, the new computing stack in the computing environment.

13. The method of claim 12, wherein the new regional computing stack is created by performing at least one of: (i) generating a shared internal deployment environment configured to deploy a computing service across a plurality of computing devices; (ii) creating a web service account for at least one of a plurality of web services; (iii) generating a hostclass for the new regional computing stack, the hostclass comprising a virtual container for a set of host computing devices; (iv) performing load balancing; (v) creating at least one user group; or (vi) generating at least one web service credential.

14. The method of claim 12, wherein the new computing stack to be deployed is a new regional computing stack associated with bringing online a data center.

15. The method of claim 12, further comprising:
monitoring, by at least one computing device, the at least one virtual process while the computing resources are created; and
sending, by the at least one computing device, a notification in response to the new computing service being allocated.

16. The method of claim 15, wherein the at least one virtual process is at least one of: a virtual machine and a thread.

17. The method of claim 16, wherein the predetermined order of creation is determined by the at least one computing device in response to an identification of a dependency during analysis of each corresponding manifest.

18. The method of claim 17, wherein the dependency is identified from each corresponding manifest by:
identifying at least one resource to be utilized by the new computing stack; and
determining that the at least one resource relies on at least one non-existing resource.

19. The method of claim 12, wherein the computing resources required by the new computing stack are allocated by:
generating, by the at least one computing device, a hostclass for the new computing stack corresponding to the individual ones of the requests, the hostclass comprising a virtual container for a set of host computing devices that shares a shared internal deployment environment.

* * * * *